Dec. 6, 1949 D. COLLINS ET AL 2,490,418
POWER PLANT FOR MOTOR VEHICLES
Filed April 1, 1946 2 Sheets-Sheet 1
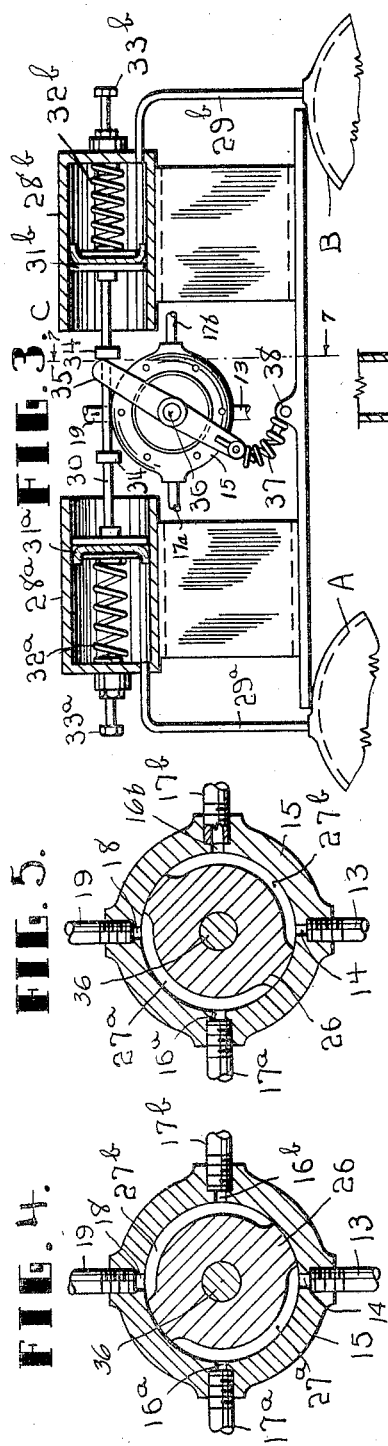
Inventors
D. COLLINS
G. S. BOYLAN Dec. 6, 1949     D. COLLINS ET AL     2,490,418
POWER PLANT FOR MOTOR VEHICLES
Filed April 1, 1946     2 Sheets-Sheet 2
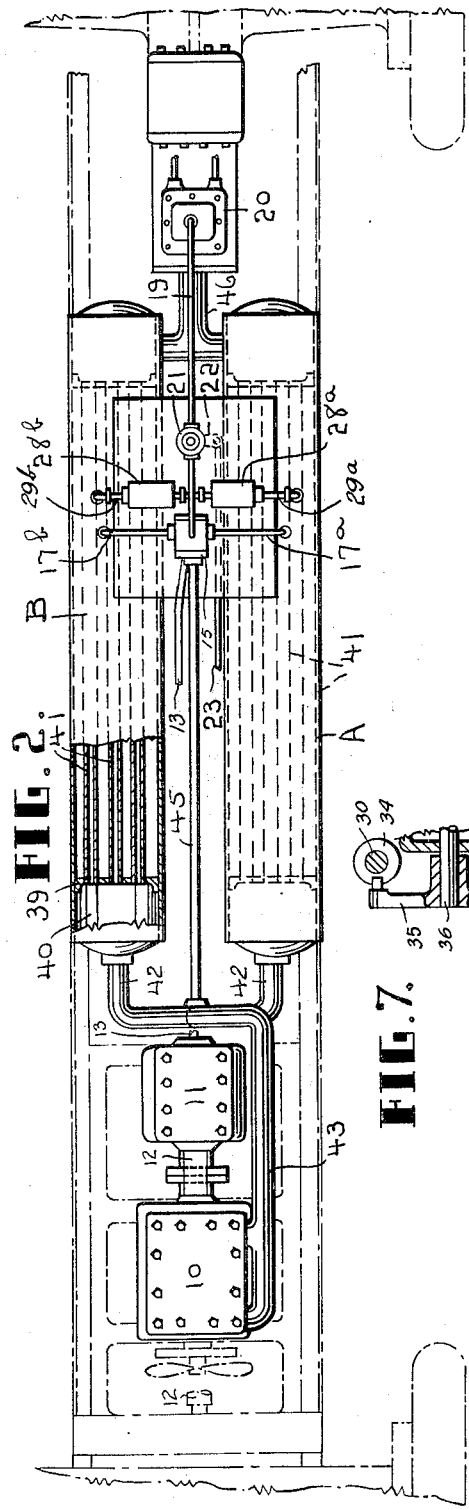
Inventors
D. COLLINS
G. S. BOYLAN Patented Dec. 6, 1949

2,490,418

UNITED STATES PATENT OFFICE 2,490,418

POWER PLANT FOR MOTOR VEHICLES

Douglas Collins, Salisbury, N. C., and Gove S. Boylan, Ridgway, Pa.

Application April 1, 1946, Serial No. 658,730

15 Claims. (Cl. 60—14)

1

This invention relates to improvements in vehicle motors particularly designed for the economical and efficient operation of land vehicles, boats and other conveyances driven at widely different speeds but requiring a uniformly high driving torque at starting as well as throughout the entire range of operating speed.

According to the invention a Diesel or other type of internal combustion engine operating only at its most efficient characteristic speed is utilized to drive a compressor delivering compressed air to a plurality of air receivers from which the compressed air is conducted under control of a throttle valve to an air motor providing the power required for the operation of the vehicle or other device at flexibly variable speed.

An object of the invention is the provision of an apparatus utilizing the hot exhaust gas from the internal combustion engine to heat the compressed air delivered to the air receiver whereby the resulting expansion of the air increases the pressure thereof and the heat exchange between the air under pressure and the exhaust gases increases the thermal efficiency of the apparatus by converting waste heat of the exhaust gas into a useful purpose.

A further object of the invention is the provision of at least two air receivers and a pressure operated control device by which a connection between one receiver and the air motor is established simultaneously with the connection of the other receiver to the compressor, such condition being maintained until the pressure in the latter receiver attains a predetermined value whereupon the connections are so changed that the first mentioned receiver is connected with the compressor and the second mentioned receiver is connected to supply air for the continued operation of the air motor.

A still further object is the provision of means actuated by the control device by which the direction of flow of the exhaust gas from the combustion engine is caused to periodically change in dependence upon the above mentioned changes in the connections of the receivers so that the heating effect is applied only to the receiver operatively connected with the air motor.

In the accompanying drawings wherein an approved embodiment of the invention is illustrated:

Figure 1 is a side elevation of the improved apparatus, essential parts of a motor vehicle being shown in dotted lines.

Figure 2 is a top plan view of the apparatus partly in section and showing the upper portions of the combustion engine and air compressor removed.

Figure 3 is an enlarged fragmentary section on the line 3—3 of Figure 1.

Figures 4 and 5 are views showing the air control valve in different positions.

Figure 6 is an enlarged sectional view showing the adjustable member for deflecting the exhaust gases from the engine to one or the other of the two air receivers.

Figure 7 is a vertical section on the line 7—7 of Figure 3.

Figure 8 is a plan view similar to Figure 2 illustrating a modified form of air receiver.

Referring to the drawings in detail the numeral 10 indicates a prime mover in the form of a Diesel or any other preferred type of internal combustion engine which, in accordance with the invention is operated only at the critical speed developing the highest possible efficiency. The crank shaft of the engine 10 is coupled directly with the drive shaft of an air compressor 11 for driving the latter and in the arrangement illustrated a water cooling system 12 common to both the engine and compressor is provided although an air cooling system may be used if preferred.

The compressor 11 is utilized to compress the air which is to be utilized as the motive fluid for the operation of the air motor to be hereinafter described in greater detail and which latter is the source of power to be used in the operation of the vehicle or other device to which the invention is applied. The air delivery pipe 13 connected with the outlet of the compressor 11 communicates with the inlet port 14 in the lower portion of the casing of a control valve 15. The opposite sides of the valve casing 15 are provided with ports 16a and 16b communicating with branch pipes 17a and 17b which lead into the two air receivers A and B. The upper portion of the valve casing 15 is provided with a port 18 connected with the pipe 19 supplying air to the air motor 20. Also in the embodiment of the invention illustrated in the drawings the power plant is shown applied to a conventional form of motor vehicle and in this case the air motor 20 is preferably coupled directly to the differential ring gear and is geared one to one therewith.

A throttle valve 21 is connected at a convenient point in the length of the air supply pipe 19 and the operation thereof is controlled by an actuating mechanism consisting, for instance, of a throttle arm 22 and linkage 23 connected with a control member 24 conveniently accessible by the operator of the vehicle.

The control valve 15 is operable to alternately connect the receivers A and B with the air motor 20 through the branch pipes 17a and 17b respectively and, in the interval, while one receiver is connected with the air motor for supplying the motive fluid therefor, the other receiver is connected with the compressor 11 for receiving therein a supply of air at a predetermined pressure. For this purpose the rotatable plug 26 of the valve is provided with channels 27a and 27b extending respectively throughout a portion of the circumference of the plug.

When the valve is in the position shown in Figure 4 the channel 27a establishes communication between the air delivery pipe 13 and the branch pipe 17a so that the motive fluid from the compressor is led into the receiver A. In the same position of the valve, the channel 27b connects the branch pipe 17b with the air supply pipe 19 and thus air from the tank B is supplied to the air motor 20 under the manual control of the throttle valve 21.

The control valve 15 is shifted alternately from one position to the other by the pressure controlled actuating device C illustrated in detail in Figure 3 and consisting of a pair of opposed cylinders 28a and 28b respectively connected by pipes 29a and 29b with the air receivers A and B. The connecting rod 30 is secured to pistons 31a and 31b sliding in the cylinders 28a and 28b and the piston assembly thus constituted is shifted in one direction or the other in dependence upon the pressure existing in the receivers A and B. To aid in determining the pressure at which the piston assembly is shifted, the pistons 31a and 31b are respectively provided with springs 32a and 32b the tension of which may be varied by the adjusting members 33a and 33b. The piston rod 30 is provided with spaced abutments 34 alternately engageable with an arm 35 on the stem 36 of the valve plug 26 so that the latter is shifted between the two positions shown in Figures 4 and 5 as the piston assembly is moved in response to relative changes in the pressure in the receivers A and B. The operation of the valve plug is accelerated by a spring 37 connected between one end of the arm 35 and the stationary point 38 so disposed that as the point of connection between the spring and the arm 35 passes dead center between the valve stem 36 and the point 38, the valve arm and plug are rapidly swung to the limit of the initiated movement.

Each of the receivers A and B is provided terminally with partitions 39 forming end chambers 40 connected by tubes 41. The chambers 40 at one end of the receivers are connected with the branches 42 communicating with the exhaust pipe 43 receiving the exhaust gases resulting from the normal operation of the engine 10. At the juncture of the branches 42 with the exhaust pipe 43 a deflector 44 is supported for swinging movement on a shaft 45. The deflector is movable between two limits whereby the passage of the heated exhaust gases to one or the other branch may be controlled.

The shaft 45 is extended rearwardly and connected with the valve plug 26 and is disposed in such angular relation thereto that as the plug is moved into the position shown in Figure 4 in which the receiver B is connected to supply air to the motor 20, the deflector 44 is adjusted to deflect the heated exhaust gases into the branch 42 communicating with the receiver B.

During the same period air from the compressor 11 is delivered to the receiver A through the channel 27a and branch pipe 17a but the deflector 44 prevents the passage of the heated exhaust gas into the receiver A. After passing through the series of tubes 41 in each receiver the exhaust gases are discharged through an outlet pipe 46 which as shown in Figure 1 is arranged to partially enclose the air discharge pipe 47 through which the air leaving the air motor 20 is led.

In the modification of the invention illustrated in Figure 8, the air receivers A' and B' are in the form of hollow tanks communicating at one end with the branches 42 of the engine exhaust pipe and connected at the opposite end with the outlet pipe 46. Within each of the receiver tanks is arranged a coil composed of connected windings 48 and 49 of different diameters and arranged one within the other.

The branch pipes 17a and 17b leading to the valve 15 are connected with the coils 48—49 at one end of the receivers A' and B'. The pipes 29a and 29b conducting the compressed air to the cylinders 28a and 28b are also connected with the coils 48—49 at suitable points.

In operation the combustion engine 10 is operated only at the critical characteristic speed developing the maximum efficiency and the operation and control thereof may be by means of governor, pressure-responsive control or other preferable device. The air compressed by the compressor 11 is conducted by the delivery pipe 13 to the port 14 in the valve 15 and assuming the latter is in the position shown in Figure 4, the motive fluid is conducted by the channel 27a through the pipe 17a to the receiver A and the pressure of air builds up in this receiver during the continued operation of the compressor. Also in this position of the valve 15 the channel 27b connects the receiver B with the air motor 20 through the branch pipe 17b and the air supply pipe 19, the operation of the air motor being controlled by adjustment of the throttle valve 21. Under this condition the deflector 44 is adjusted by the shaft 45 and valve plug 26 to the position in which the heated exhaust gas from the combustion engine is conducted to the receiver B so that the air in that receiver is subjected to the heating effect of the exhaust gas and the air pressure is accordingly increased. The exhaust gases transversing the receiver B are discharged through the outlet pipe 46 and in flowing over the air outlet 47 of the motor 20, the tendency to accumulate condensation frost is offset. When the pressure in the receiver A reaches a predetermined value with relation to the decreasing pressure in the receiver B, the piston assembly 30—31a—31b is shifted and by cooperation of one of the abutments 34 with the arm 35, the valve plug 26 is shifted from the position shown in Figure 4 to that shown in Figure 5. Consequently, the channel 27b connects the air delivery pipe 13 with the branch pipe 17b and the compressed air from the compressor 11 is conducted to the receiver B, the deflector 44 being simultaneously turned by the shaft 45 to deflect the hot exhaust gases into the receiver A. In this manner the receiver A is connected to supply compressed air for the operation of the motor 20 while the receiver B is connected to receive compressed air from the compressor.

What we claim is:

1. In a power plant, an internal combustion engine having an outlet for exhaust gas, an air compressor driven by said engine, a pair of hollow bodies forming air receivers for alternate connection with the compressor, a first valve means for alternately connecting said receivers and said compressor, means for conducting hot exhaust gas from the engine outlet to said receivers for facilitating transfer of heat from the exhaust gas to the receiver air through the material of the bodies, and a second valve means for controlling said conducting means, said first and second valve means being so interconnected that the gas is conducted to each receiver when air from the compressor is being conducted to the other receiver.

2. In a power plant, an internal combustion engine, an air compressor driven by said engine, two air receivers, an air motor, connections between the receivers and the compressor and between the receivers and the air motor, and control means periodically changing said connections in response to predetermined variations of the pressure differential between said receivers whereby during one period the compressor is connected with one of said receivers while the other receiver is connected with the air motor and during the succeeding period the first mentioned receiver is connected with the air motor and the second mentioned receiver is connected with the compressor.

3. A power plant as claimed in claim 2 provided with means for facilitating transfer of heat from the hot exhaust gas from the combustion engine to the air in said receivers.

4. A power plant as claimed in claim 1 provided with an air motor connected with said receivers, and means to connect each of said receivers with said air motor when the other receiver is connected with said compressor.

5. A power plant as claimed in claim 2 provided with means for facilitating transfer of heat from the hot exhaust gas from the combustion engine to the air in said receivers, and means actuated by said control means to render said transfer means ineffective with respect to the receiver connected with said compressor.

6. A power plant as claimed in claim 1 provided with an air motor connected with said receiver and having an air discharge pipe, and a discharge pipe for the conducting means for the engine exhaust gas surrounding the outer end of said air discharge pipe.

7. A power plant as claimed in claim 2 provided with a throttle valve in the connection between the receivers and the air motor.

8. A power plant as claimed in claim 2 provided with a pipe connected with the engine exhaust and having branches respectively arranged in heat exchange relation to said receivers, pivotally mounted deflecting means to deflect the exhaust gas into the branch having heat exchange relation with the receiver connected with the air motor, and means operable by said control means for pivoting said deflecting means.

9. A power plant as claimed in claim 2 provided with means for conducting hot exhaust gas from the combustion engine alternately to the receivers, and means, controlled by the pressure of air in the receivers, for controlling said conducting means.

10. A power plant as claimed in claim 2 wherein said control means includes a two-way valve alternately communicating with the two receivers.

11. A power plant as claimed in claim 2 wherein said control means includes a valve controlling communication through said connections and pressure operated devices connected with said receivers for actuating said valve.

12. A power plant as claimed in claim 2 wherein said control means includes a valve controlling communication through said connections and pressure operated devices connected with said receivers for actuating said valve, and spring biasing means operative to retain said valve in the adjusted position.

13. A power plant as claimed in claim 2 provided with a pipe connected with the engine exhaust and having branches respectively arranged in heat exchange relation to said receivers, deflecting means arranged in said pipe, said control means including a valve, and a connection between said valve and said deflecting means.

14. A power plant as claimed in claim 2 wherein said control means includes a valve, an actuating arm on said valve, opposed cylinders connected with said receivers, coupled pistons mounted in said cylinders, and spaced abutments on the coupled pistons alternately engageable with the arm for moving the valve in opposite directions.

15. A power plant as claimed in claim 2 wherein said control means includes a valve, an actuating arm on said valve, opposed cylinders connected with said receivers, coupled pistons mounted in said cylinders, spaced abutments on the coupled pistons alternately engageable with the arm for moving the valve in opposite directions, and means operative to accelerate the movement of the valve initiated by said coupled pistons.

DOUGLAS COLLINS.
GOVE S. BOYLAN.

REFERENCES CITED

The following references are of record in the file of this patent:

UNITED STATES PATENTS

| Number | Name | Date |
|---|---|---|
| 878,953 | Hess | Feb. 11, 1908 |
| 1,916,242 | Williams | July 4, 1933 |

FOREIGN PATENTS

| Number | Country | Date |
|---|---|---|
| 22,947 | Great Britain | Nov. 8, 1905 |